(12) United States Patent
Shi et al.

(10) Patent No.: US 12,195,214 B2
(45) Date of Patent: Jan. 14, 2025

(54) UNMANNED AERIAL VEHICLE PARKING DEVICE

(71) Applicant: AUTEL ROBOTICS CO., LTD., Shenzhen (CN)

(72) Inventors: Kang Shi, Guangdong (CN); Biwang Lai, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 27 days.

(21) Appl. No.: 18/335,267

(22) Filed: Jun. 15, 2023

(65) Prior Publication Data

US 2024/0002080 A1   Jan. 4, 2024

(30) Foreign Application Priority Data

Jun. 29, 2022   (CN) .......................... 202210785024.7

(51) Int. Cl.
*B64U 70/90*   (2023.01)
*B64F 1/222*   (2024.01)
*B64F 1/36*   (2017.01)

(52) U.S. Cl.
CPC .............. *B64U 70/90* (2023.01); *B64F 1/222* (2013.01); *B64F 1/362* (2013.01)

(58) Field of Classification Search
CPC ......... B64U 70/90; B64U 70/97; B64F 1/222; B64F 1/362
See application file for complete search history.

(56) References Cited

U.S. PATENT DOCUMENTS

| 2014/0124621 | A1* | 5/2014 | Godzdanker | ............. | B64F 1/28 244/110 E |
| 2019/0023416 | A1* | 1/2019 | Borko | .................. | B65G 1/0485 |
| 2020/0079529 | A1* | 3/2020 | Raz | .......................... | G05D 3/10 |

FOREIGN PATENT DOCUMENTS

| CN | 108482697 A | 9/2018 |
| CN | 110667869 A | 1/2020 |
| WO | WO2019055685 A1 | 3/2019 |

OTHER PUBLICATIONS

Extended European Search Report issued Nov. 6, 2023 by EPO.

* cited by examiner

*Primary Examiner* — Tye William Abell
(74) *Attorney, Agent, or Firm* — Frank Gao, Esq.

(57) ABSTRACT

An unmanned aerial vehicle parking device includes a parking platform and a blocking assembly. The parking platform is configured to bear an unmanned aerial vehicle. The blocking assembly includes a driving rod and a stop bar, the stop bar is connected to a driving rod, and the driving rod is configured to move between the first position and the second position. When the driving rod moves from the first position to the second position, the driving rod drives the stop bar to rotate such that the stop bar lies flat relative to the parking platform, and the stop bar may not block the blade of the unmanned aerial vehicle from rotating. When the driving rod moves from the second position to the first position, the stop bar rotates relative to the driving rod and abuts against the parking platform.

19 Claims, 6 Drawing Sheets

UNMANNED AERIAL VEHICLE PARKING DEVICE

CROSS-REFERENCE TO RELATED APPLICATIONS

This application claims priority of Chinese Patent Application No. 202210785024.7, filed on Jun. 29, 2022, entitled as "Unmanned aerial vehicle parking device", the contents of which are incorporated herein by reference.

BACKGROUND

Technical Field

The present disclosure relates to the technical field of unmanned aerial vehicles, and in particular to an unmanned aerial vehicle parking device.

Related Art

After unmanned aerial vehicles land, the states of rotor blades are different. If the blades are randomly placed, because the area occupied by the blades is larger than the area occupied by the unmanned aerial vehicles themselves, a large amount of space is occupied when the blades are stored. As shown in FIG. 1, in the related art, the blades are folded by means of manual blade poking, and manual blade poking is not conducive to the automatic use of unmanned aerial vehicles.

SUMMARY

The object of the present disclosure is to provide an unmanned aerial vehicle parking device that can automatically collapse the blades of an unmanned aerial vehicle while facilitating the subsequent take-off of an unmanned aerial vehicle.

In order to achieve the above object, the disclosure adopts the technical solutions below:

an unmanned aerial vehicle parking device, including a parking platform and a blocking assembly. The parking platform is used to carry an unmanned aerial vehicle; a blocking assembly includes a driving rod and a stop bar, wherein the stop bar is connected to the driving rod, and the driving rod is configured to move between a first position and a second position; when the driving rod moves from the first position to the second position, the driving rod drives the stop bar to rotate so that the stop bar lies flat relative to the parking platform, and the stop bar may not block a blade of the unmanned aerial vehicle from rotating; when the driving rod moves from the second position to the first position, the stop bar rotates relative to the driving rod and abuts against the parking platform so that the stop bar erects relative to the parking platform, and the stop bar may block the rotation of the blade of the unmanned aerial vehicle.

In some alternative embodiments, the blocking assembly comprises a movable rod respectively connected to the driving rod and the stop bar;

wherein the driving rod is configured to move between the second position and a third position, and the stop bars are all placed flat relative to the parking platform; when the driving rod moves from the second position to the third position, the driving rod drives the movable rod to rotate so as to be viewed in a direction perpendicular to the parking platform, and a projection of the stop bar on the parking platform completely overlaps with the parking platform; when the driving rod moves from the third position to the second position, the movable rod rotates relative to the driving rod and abuts against the driving rod so as to be viewed in a direction perpendicular to the parking platform, and the projection of the stop bar on the parking platform partially overlaps with the parking platform.

In some alternative embodiments, the blocking assembly further comprises a stop block fixed to the parking platform, the stop block having a first surface provided adjacent to the parking platform and a second surface provided opposite the parking platform, the first surface being provided with a first blocking portion, and the second surface being provided with a second blocking portion;

wherein the movable rod comprises a first support arm and a second support arm arranged perpendicular to each other, the driving rod is rotatably connected to the first support arm, a connecting point of the driving rod to the first support arm is offset from an end portion of the first support arm away from one end of the second support arm, the stop bar is rotatably connected to the second support arm, and the connecting point of the stop bar to the second support arm is offset from the end portion of the stop bar near one end of the second support arm;

when the driving rod moves from the first position to the second position, the driving rod drives the stop bar to rotate, and the end portion of the stop bar near one end of the second support arm is blocked by the first blocking portion to abut against the second surface, so that the stop bar lies flat relative to the parking platform, wherein the second support arm abuts against the driving rod under a rotation action of a movable piece;

when the driving rod moves from the second position to the third position, the driving rod drives the movable rod to rotate, and the end portion of the first support arm away from one end of the second support arm is blocked by the second blocking portion so as to abut against the second blocking portion, so that the stop bar maintains lying flat relative to the parking platform;

when the driving rod moves from the second position to the first position, the end portion of the stop bar near one end of the second support arm abuts against the parking platform under the rotation action of the stop bar, so that the stop bar erects relative to the parking platform, wherein the second support arm remains abutting against the driving rod under the rotation action of the movable piece.

In some alternative embodiments, the end portion of the first blocking portion toward one end of the stop bar is rounded off.

In some alternative embodiments, the unmanned aerial vehicle parking device further comprises a first re-centering assembly and a second re-centering assembly, wherein the first re-centering assembly and the second re-centering assembly are both fixed to the parking platform, and the first re-centering assembly and the second re-centering assembly are together configured to push the unmanned aerial vehicle from a parking position to a re-centering position;

wherein the driving rod is connected to the first re-centering assembly.

In some alternative embodiments, the first re-centering assembly comprises a first driving mechanism and a first movable seat, wherein the first driving mechanism is fixed to the parking platform, the first movable seat is connected to the first driving mechanism and the number of the first movable seat is two, and the first driving mechanism is configured to drive the two first movable seats towards or away from each other;

the second re-centering assembly comprises a second driving mechanism and a second movable seat, wherein the second driving mechanism is fixed to the parking platform, the second movable seat is connected to the second driving mechanism and the number of the second movable seat is two, and the second driving mechanism is configured to drive the two second movable seats close to or away from each other, wherein a motion direction of the second movable seat is perpendicular to the motion direction of the first movable seat;

the number of the blocking assemblies is two, the driving rod of one of the two blocking assemblies being connected to one of the two first movable seats.

In some alternative embodiments, at least one of the first driving mechanism and the second driving mechanism is a lead screw driving mechanism.

In some alternative embodiments, the unmanned aerial vehicle parking device comprises a control board, and the control board is electrically connected to the first driving mechanism and the second driving mechanism respectively, so that while the first driving mechanism drives the first movable seat to move, the second driving mechanism drives the second movable seat to move.

In some alternative embodiments, the unmanned aerial vehicle parking device comprises a charging interface, the charging interface being fixed to the first movable seat, the charging interface being electrically connected to the control board, and the charging interface being configured to connect to a power source of the unmanned aerial vehicle.

In some alternative embodiments, the charging interface is a pogo pin.

Advantageous effects of embodiments of the present disclosure are as follows: in an embodiment of the present disclosure, when the driving rod in the blocking assembly drives to the first position, the stop bar is converted from the flat-lying state to the erecting state so that it can block the rotation of the blade of the unmanned aerial vehicle, so as to play the role of collapsing the blades of the unmanned aerial vehicle. When the driving rod in the blocking assembly drives to the second position, the stop bar is converted from the erecting state to the flat-lying state, and the stop bar no longer blocks the rotation of the blade of the unmanned aerial vehicle, so as to ensure the normal take-off of the unmanned aerial vehicle. In addition, compared to other unmanned aerial vehicle parking devices, the embodiment of the present disclosure requires fewer structures to achieve the collapsing of the blades of an unmanned aerial vehicle, and the structure of the unmanned aerial vehicle parking device is more compact, facilitating the miniaturization of the unmanned aerial vehicle parking device.

BRIEF DESCRIPTION OF THE DRAWINGS

In order to illustrate specific embodiments of the present disclosure or the technical solutions in the prior art more clearly, the following will briefly introduce the drawings that need to be used in the description of the specific embodiments or the prior art. Throughout the drawings, like elements or portions are generally identified by like reference numerals. In the drawings, elements or portions may not necessarily be drawn to the actual scale.

DETAILED DESCRIPTION OF THE DISCLOSURE

The technical solutions in the embodiments of the present disclosure will be clearly and completely described below in conjunction with the accompanying drawings in the embodiments of the present disclosure. Obviously, the described embodiments are only a part of the embodiments of the present disclosure, rather than all the embodiments. The description of at least one exemplary embodiment below is actually only illustrative and does not serve as any limitation on the present disclosure, and the application or use thereof. Based on the embodiments of the present disclosure, all other embodiments obtained by one of ordinary skills in the art without involving any inventive effort are within the scope of the present disclosure.

Techniques, methods, and equipment known to those of ordinary skill in the relevant art may not be discussed in detail, but the techniques, methods, and equipment should be considered part of the granted description where appropriate.

In the description of the present disclosure, it should be noted that the orientation or positional relationships indicated by directional words such as "front, back, up, down, left, right", "transverse, vertical, perpendicular, horizontal", and "top and bottom" are usually based on the orientation or positional relationships shown in the accompanying drawings, only for the convenience of describing the present disclosure and simplifying the description. In the absence of contrary descriptions, these directional terms do not indicate or imply that the device or element referred to must have a specific orientation or be constructed and operated in a specific orientation, and therefore cannot be understood as limiting the scope of protection of the present disclosure; the directional terms "inside and outside" refer to the inside and outside of the contour relative to each component itself.

In describing the present disclosure, it should be noted that the use of the terms "first", "second", and the like to define components and parts is merely to facilitate the distinction of the corresponding components and parts, and such terms are not intended to have a special meaning unless otherwise indicated, and thus should not be construed as limiting the scope of the present disclosure.

Figure 1:
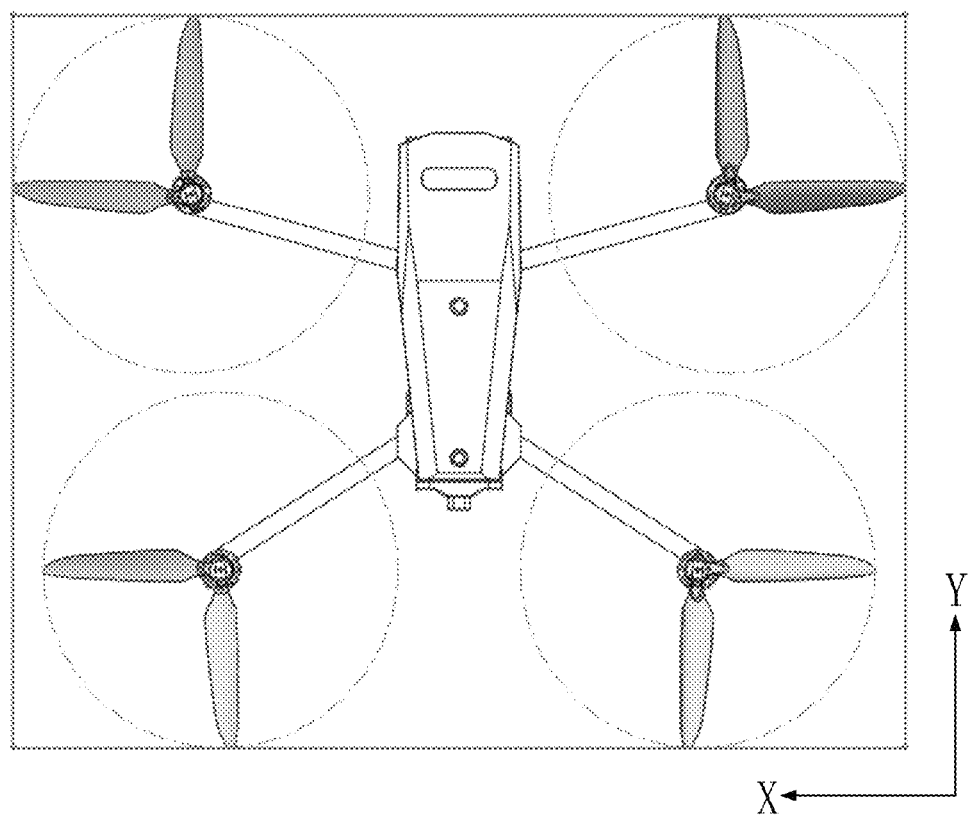
FIG. 1 is a schematic structural diagram of an unmanned aerial vehicle parking device provided in the related art.
Figure 2:
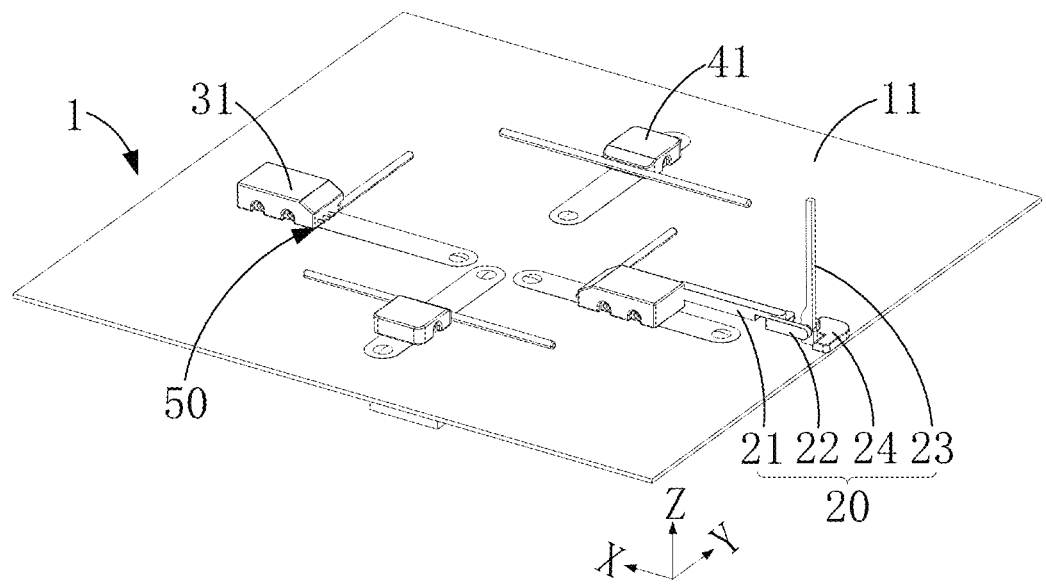
FIG. 2 is a schematic structural diagram of an unmanned aerial vehicle parking device provided by an embodiment of the present disclosure.
Figure 3:
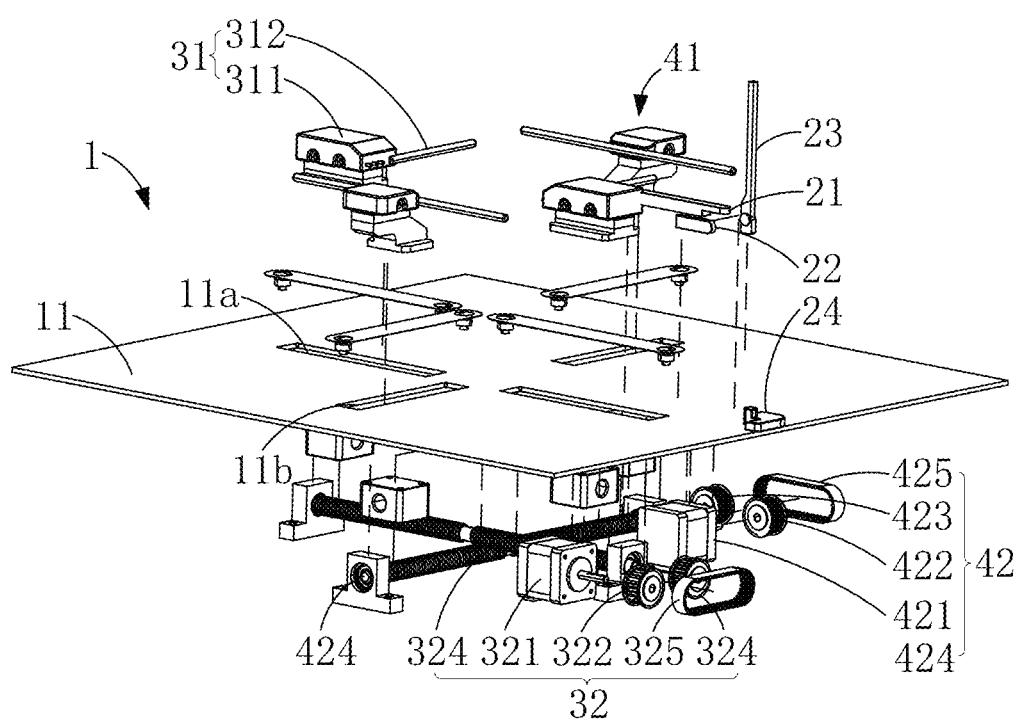
FIG. 3 is an explosive view of a structure of the unmanned aerial vehicle parking device shown in FIG. 2.
Figure 4:
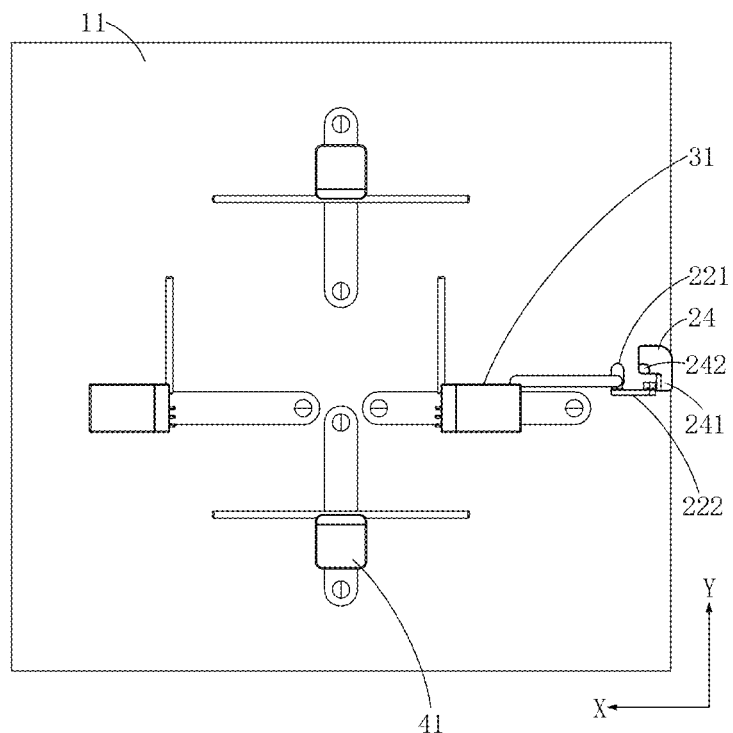
FIG. 4 is a schematic structural diagram of the unmanned aerial vehicle parking device shown in FIG. 2 from another angle.

Referring to examples shown in FIGS. 2 to 4, FIG. 2 is a schematic structural diagram of an unmanned aerial vehicle parking device 1 provided by an embodiment of the present disclosure, FIG. 3 is an explosive view of the structure of the unmanned aerial vehicle parking device 1 shown in FIG. 2, and FIG. 4 is a schematic structural diagram of the unmanned aerial vehicle parking device 1 shown in FIG. 2 from another angle. The unmanned aerial vehicle parking device 1 comprises a parking platform, a first re-centering assembly, a second re-centering assembly, a blocking assembly, and a control board. The parking platform is not only a bearing structure of the unmanned aerial vehicle, but also a mounting support structure for each component mentioned above. The first re-centering assembly and the second re-centering assembly are both mounted to the parking platform and are both electrically connected to the control board. The first re-centering assembly and the second re-centering assembly are used together to move the unmanned aerial vehicle from the parking position to the re-centering position. The first re-centering assembly may be connected to the blocking assembly. When the unmanned aerial vehicle moves from the parking position to the re-centering position, the blocking assembly can block the rotation of the blade of the unmanned aerial vehicle. Under the drive of the first re-centering assembly, the blade is driven to rotate relative to the motor of the unmanned aerial vehicle, so that the blade collapses into an area enclosed by the fuselage of the unmanned aerial vehicle and two adjacent motors. When the first re-centering assembly is reset, the blocking assembly can no longer block the blade rotation of the unmanned aerial vehicle under the drive of the first re-centering assembly, so as to ensure the normal take-off of the unmanned aerial vehicle.

In order to be able to clearly describe each orientation in the following, each direction is defined by means of the coordinate system in FIG. 2. The coordinate axis X represents the first direction, which is the direction of the relative arrangement of the two first elongated holes 11a of the parking platform and which is also the direction in which the two first movable seats 31 of the first re-centering assembly approach or move away from each other; the coordinate axis Y represents the second direction, which is the relative arrangement direction of the two second elongated holes 11b of the parking platform, and is also the direction in which the two second movable seats 41 of the second re-centering assembly approach or move away from each other; the coordinate axis Z represents the third direction, which is perpendicular to the first direction and the second direction, in other words, perpendicular to the plane where the parking plate 11 of the parking platform is located.

Based on the above orientation definition, the detailed structure of the parking platform, the blocking assembly, and the re-centering assembly will be described next in detail with reference to the illustrations in the drawings. The terms used below, such as "up", "down", "top", "bottom", etc., to indicate orientation or positional relationships, are all relative to the third direction Z. Without conflict, the following embodiments and the features in the embodiments can be combined with each other.

With regard to the above-mentioned parking platform, the parking platform comprises a parking plate 11 and a main body of the parking platform. The main body of the parking platform is provided with a cavity and an opening communicating the cavity with the outside. The cavity is configured to accommodate the first re-centering assembly and the second re-centering assembly. The parking plate 11 is mounted at the opening and closes the opening; the parking plate 11 is configured to bear the unmanned aerial vehicle. The parking plate 11 is provided with the first elongated hole 11a and the second elongated hole 11b. The first elongated hole 11a is configured to cooperate with the first re-centering assembly, so as to guide the first re-centering assembly. The second elongated hole 11b is configured to cooperate with the second re-centering assembly to guide the second re-centering assembly. Specifically, the number of the first elongated holes 11a and the second elongated holes 11b is respectively two. In the first direction X, two first elongated holes 11a are arranged at intervals in the parking plate 11. In the second direction Y, two second elongated holes 11b are arranged at intervals in the parking plate 11. In the third direction Z, the two first elongated holes 11a are symmetrically arranged with the line segment formed by connecting the two second elongated holes 11b as the axis of symmetry.

For the first re-centering assembly described above, referring to the example shown in FIG. 2 in conjunction with FIG. 3, the first re-centering assembly includes a first driving mechanism 32 and a first movable seat 31. The first driving mechanism 32 is fixed in the cavity of the main body of the parking platform, and the first driving mechanism 32 is electrically connected to the control board. The first movable seat 31 is embedded in the first elongated hole 11a and is movably connected to the first driving mechanism 32, and the first movable seat 31 is used to be connected to the blocking assembly, thereby driving the blocking assembly to move relative to the parking plate 11. Specifically, the first driving mechanism 32 includes a first driving motor 321, a first driving wheel 322, a first driven wheel 323, a first timing belt 325, and a first lead screw 324. The first driving motor 321 and the first lead screw 324 are both fixed to the main body of the parking platform, and the first lead screw 324 can rotate about its own axis. The first driving wheel 322 is fixed to a rotating shaft of the first driving motor 321, the first driven wheel 323 is fixed to one end of the first lead screw 324, and the first timing belt 325 is sleeved between the first driving wheel 322 and the first driven wheel 323. The first lead screw 324 is provided with an external thread, the first movable seat 31 is provided with an internal thread adapted to the external thread, and the first movable seat 31 is threadedly connected to the first lead screw 324 such that in the first direction X, the first driving mechanism 32 is configured to drive the first movable seat 31 to move relative to the parking plate 11. Illustratively, the number of the first movable seat 31 is two, and one first movable seat 31 is embedded in the first elongated hole 11a. The internal threads of the two first movable seats 31 are oppositely rotated. When the first driving motor 321 drives the first movable seat 31 to move, the two first movable seats 31 are close to each other or far away from each other due to the opposite thread rotating directions. In this way, the unmanned aerial vehicle can be parked on the parking plate 11 while two opposite sides of the unmanned aerial vehicle are acted on, in order to align the unmanned aerial vehicle's posture on the two opposite sides in the first direction X. In addition, since the two first movable seats 31 share one driving mechanism, not only the manufacturing cost of the unmanned aerial vehicle parking device 1 can be saved, but also the space occupied by the first re-centering assembly can be saved, which is beneficial to the miniaturization of the unmanned aerial vehicle parking device 1. It could be understood that the two first movable seats 31 may also be driven towards or away from each other by separate driving mechanisms, and the manner in which the first driving mechanism drives the first movable seat 31 is not particularly limited by the present disclosure. For example, the first driving mechanism may employ a motor gear rack structure or like structures capable of linear motion.

With respect to the second re-centering assembly described above, and with continuing reference to the example shown in FIG. 2 in conjunction with FIG. 3, the second re-centering assembly includes a second driving mechanism 42 and a second movable seat 41. The second driving mechanism 42 is fixed in the cavity of the parking platform, and the second driving mechanism 42 is electrically connected to the control board. The second movable seat 41 is embedded into the second elongated hole 11b and movably connected to the second driving mechanism 42. Specifically, the second driving mechanism 42 includes a second driving motor 421, a second driving wheel 422, a second driven wheel 423, a second timing belt 425, and a second lead screw 424. Both the second driving motor 421 and the second lead screw 424 are fixed to the main body of the parking platform, and the second lead screw 424 can rotate around its own axis. The second lead screw 424 is arranged alternately with the first lead screw 324 in the third direction Z. The second driving wheel 422 is fixed to the rotating shaft of the second driving motor 421, the second driven wheel 423 is fixed to one end of the second lead screw 424, and the second timing belt 425 is sleeved on the second driving wheel 422 and the second driven wheel 423. The second lead screw 424 is provided with an external thread, the second movable seat 41 is provided with an internal thread adapted to the external thread, and the second movable seat 41 is threadedly connected to the second lead screw 424 so that in the second direction Y, the second driving mechanism 42 is configured to drive the second movable seat 41 to move relative to the parking plate 11. Illustratively, the number of the second movable seats 41 is two, and one second movable seat 41 is embedded into one second elongated hole 11b. The internal threads of the two second movable seats 41 are opposite in rotational direction, and correspondingly, the second lead screw 424 is also provided with two external threads opposite in rotational direction. When the second driving motor 421 drives the second movable seat 41 to move, the two second movable seats 41 are close to each other or far away from each other due to the opposite thread rotational directions. In this way, the unmanned aerial vehicle can be parked on the parking plate 11 while the other two opposite sides of the unmanned aerial vehicle are acted on, in order to align the unmanned aerial vehicle's posture on the two opposite sides in the second direction Y. In addition, since the two second movable seats 41 share one driving mechanism, not only the manufacturing cost of the unmanned aerial vehicle parking device 1 can be saved, but also the space occupied by the second re-centering assembly can be saved, which is beneficial to the miniaturization of the unmanned aerial vehicle parking device 1. It could be understood that the two second movable seats 41 may also be driven towards or away from each other by separate driving mechanisms, and the manner in which the driving mechanism drives the second movable seat 41 is not particularly limited by the present disclosure. For example, the driving mechanism may employ a motor gear rack structure or like structures capable of linear motion.

It should be noted that the re-centering position can be the center position of the parking platform or not, and the specific position can be set by technicians in the art according to the actual situation. Both the two first movable seats 31 and the two second movable seats 41 act on the landing gear of the unmanned aerial vehicle to realize the movement of the unmanned aerial vehicle from the parking position to the re-centering position. To this end, the first movable seat 31 and/or the second movable seat 41 may include a movable seat body 311 and a push rod 312. The push rod 312 is connected to one end of the movable seat body 311 facing the centering position. When the unmanned aerial vehicle moves from the parking position to the re-centering position, the push rods 312 of the two first movable seats 31 respectively push the unmanned aerial vehicle from the two sides of the landing gear of the unmanned aerial vehicle at the same time under the driving of the first driving mechanism 32, and the push rods 312 of the other two second movable seats 41 can respectively push the unmanned aerial vehicle from the other two sides of the landing gear of the unmanned aerial vehicle at the same time under the driving of the second driving mechanism 42, thereby limiting the movement of the landing gear of the unmanned aerial vehicle. After the re-centering of the unmanned aerial vehicle is completed, both the first movable seat 31 and the second movable seat 41 can be reset.

Figure 5:
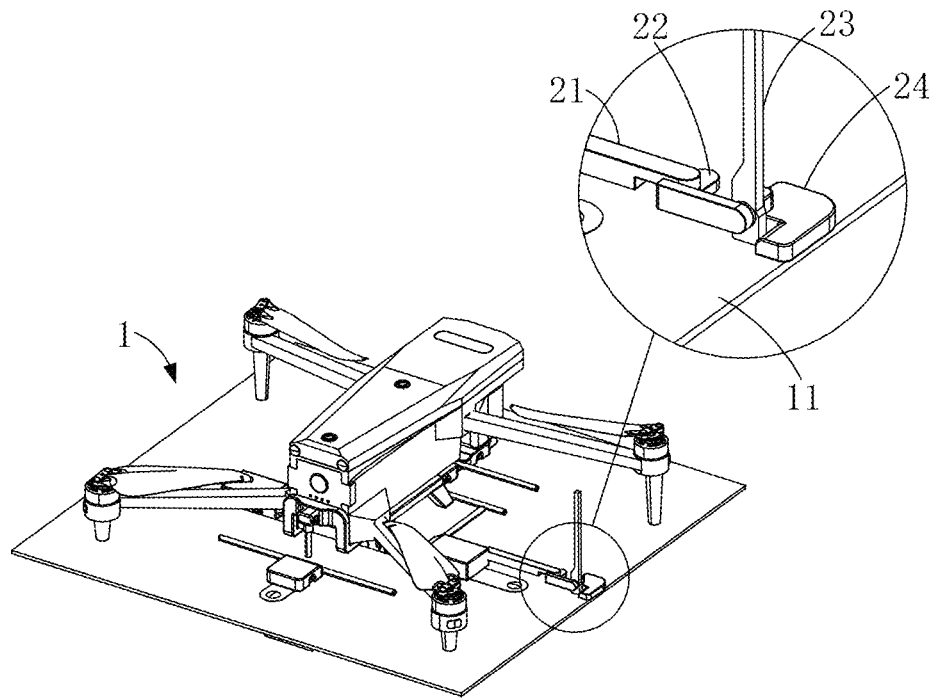
FIG. 5 is a schematic structural diagram of a driving rod in the first position in an unmanned aerial vehicle parking device provided by an embodiment of the present disclosure.
Figure 6:
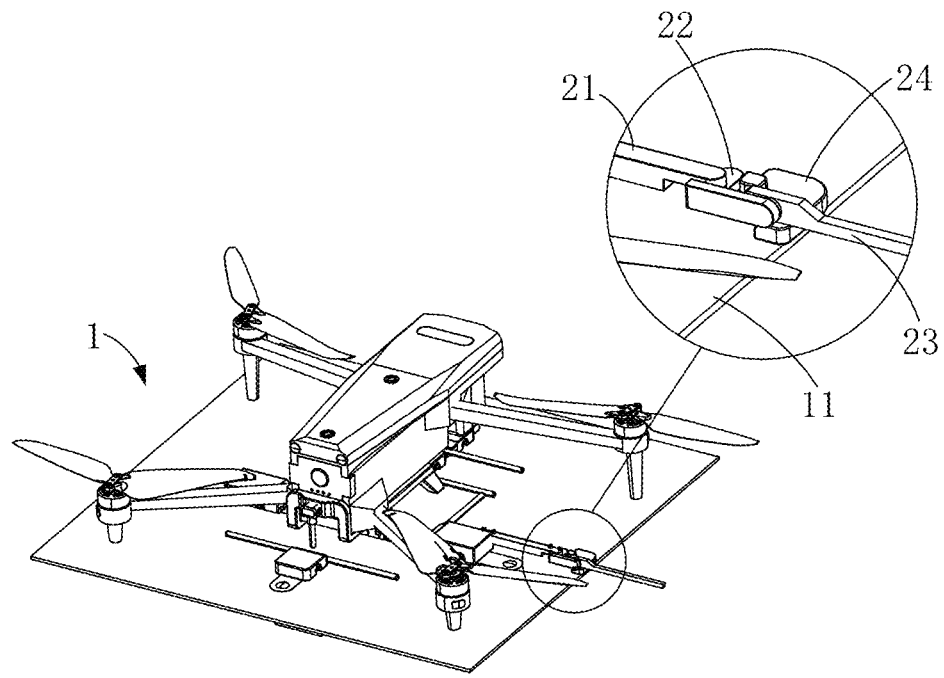
FIG. 6 is a schematic structural diagram of the driving rod in FIG. 5 in the second position.
Figure 7:
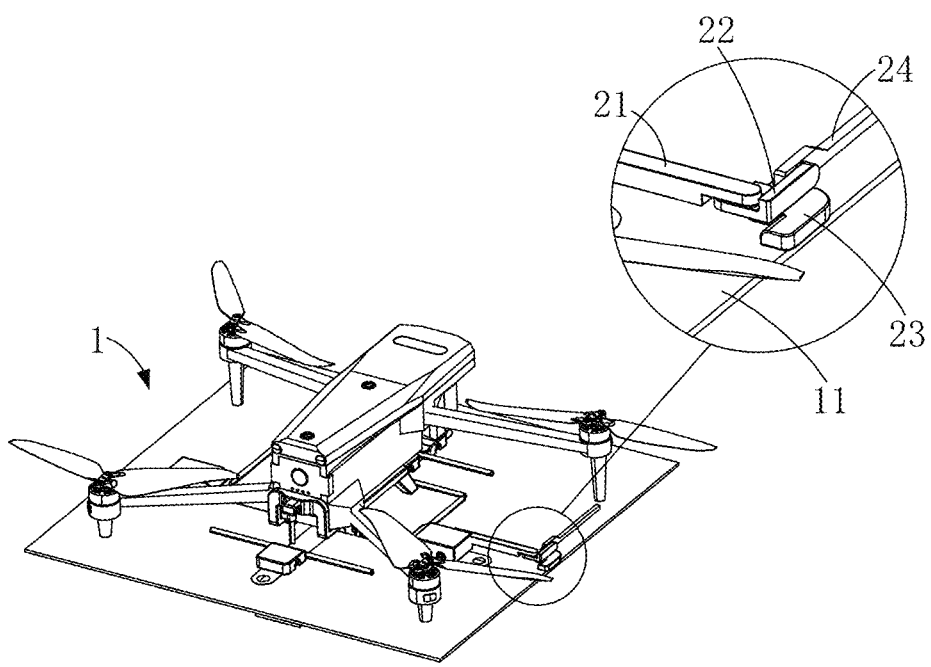
FIG. 7 is a schematic structural diagram of the driving rod in FIG. 5 in the third position.

With regard to the above-mentioned blocking assembly, reference is made to the example shown in FIG. 2 in conjunction with FIGS. 5-7. FIG. 5 is a schematic structural diagram of a driving rod in the first position in an unmanned aerial vehicle parking device 1 provided by an embodiment of the present disclosure. FIG. 6 is a schematic structural diagram of the driving rod in FIG. 5 in the second position. FIG. 7 is a schematic structural diagram of the driving rod in FIG. 5 in the third position. The blocking assembly comprises a driving rod 21, a movable rod 22, a stop bar 23, and a stop block 24. The driving rod 21 has a substantially elongated rod-like structure, one end of the driving rod 21 is fixed to the first movable seat 31, and the driving rod 21 is movable among the first position, the second position, and the third position along with the movement of the first movable seat 31. The other end of the driving rod 21 is provided with an avoidance notch (not shown). The movable rod 22 has a substantially L-shaped structure, and the movable rod 22 comprises a first support arm 221 and a second support arm 222 connected to the first support arm 221. The first support arm 221 is rotatably connected to the other end of the driving rod 21, and the end of the first support arm 221 away from one end of the second support arm 222 passes through and protrudes out of the avoidance notch; one end of the second support arm 222 away from the first support arm 221 is rotatably connected to the stop bar 23, and the connection point of the stop bar 23 with the second support arm 222 is offset from the end of the stop bar 23 near one end of the second support arm 222. The stop block 24 is fixed to the parking plate 11, the stop block 24 has a first surface arranged adjacent to the parking plate 11 and a second surface arranged opposite to the parking plate 11, the first surface is provided with a first blocking portion 241, and the second surface is provided with a second blocking portion 242. The movable rod 22 can be rotatably connected to the driving rod 21 through a torsion rotating shaft, which can provide a rotational force to the movable rod 22. The stop bar 23 may also be rotatably connected to the movable rod 22 by means of another torsion rotating shaft, which can provide a rotational force for the stop bar 23.

When the driving rod 21 is in the first position, the surface of the second support arm 222 facing the first support arm 221 abuts against the driving rod 21 under the rotational force of the torsion rotating shaft, and the end face of the stop bar 23 near one end of the second support arm 222 abuts against the parking plate 11 under the rotational force of the torsion rotating shaft, so that the stop bar 23 can be erected relative to the parking plate 11, and the erected stop bar 23 can block the rotation of the blade of the unmanned aerial vehicle.

When the driving rod 21 is in the second position, the surface of the second support arm 222 facing the first support arm 221 always abuts against the driving rod 21 under the rotational force of the torsion rotating shaft. The surface of the stop bar 23 adjacent to the end face near one end of the second support arm 222 abuts against the first blocking portion 241 under the action of the driving force of the driving rod 21 and the rotational force of the torsion rotating shaft at the same time, so that the stop bar 23 can lie flat relative to the parking plate 11, the lying stop bar 23 may not block the rotation of the blade of the unmanned aerial vehicle, and the projection of the stop bar 23 on the parking plate 11 partially overlaps with the parking plate 11 when it is viewed in the third direction Z.

When the driving rod 21 moves from the first position to the second position, an end portion of the stop bar 23 near one end of the second support arm 222 is blocked by the first blocking portion 241 of the stop block 24 to rotate in a direction near the second support arm 222 until the surface of the stop bar 23 adjacent to an end face near one end of the second support arm 222 abuts against the first blocking portion 241, thereby converting the erected stop bar 23 into a lying stop bar 23.

When the driving rod 21 is in the third position, the end portion of the first support arm 221 that extends out of one end of the avoidance notch is simultaneously subjected to the driving force of the driving rod 21 and the rotational force of the torsion rotating shaft to abut against the second blocking portion 242. The surface of the stop bar 23 adjacent to the end face near one end of the second support arm 222 is always abutted against the second surface of the stop block 24 by the action of the driving force of the driving rod 21 and the rotational force of the torsion rotating shaft, and the projection of the stop bar 23 on the parking plate 11 completely overlaps with the parking plate 11 when it is viewed in the third direction Z.

When the driving rod 21 moves from the second position to the third position, the end portion of the first support arm 221 extending out of one end of the avoidance notch is blocked by the second blocking portion 242 of the stop block 24 to rotate in a direction close to the avoidance notch until the end portion of the first support arm 221 extending out of one end of the avoidance notch abuts against the second blocking portion 242, thereby withdrawing the lying stop bar 23 into the parking platform.

In an embodiment of the present disclosure, an unmanned aerial vehicle parking on the parking plate 11 can be moved to the re-centering position by the cooperation of the first re-centering assembly and the second re-centering assembly. In addition, in the process of re-centering the unmanned aerial vehicle, the driving rod 21 in the blocking assembly is driven by the first re-centering assembly, and the stop bar 23 in the blocking assembly is converted from a lying state to an erecting state under the joint action of the driving rod 21, the movable rod 22, and the stop block 24, thereby collapsing the blade of the unmanned aerial vehicle. When the unmanned aerial vehicle moves to the re-centering position, the first re-centering assembly and the second re-centering assembly are reset, and the stop bar 23 in the blocking assembly is converted from the erecting state to the lying state again under the combined action of the driving rod 21, the movable rod 22, and the stop block 24, and is collapsed on the parking platform, so that the blade of the unmanned aerial vehicle is not blocked from rotating so as to ensure the normal take-off of the unmanned aerial vehicle. Furthermore, compared to other unmanned aerial vehicle parking devices 1, the embodiment of the present disclosure requires fewer structures to achieve the collapsing of the blades of an unmanned aerial vehicle, and the structure of the unmanned aerial vehicle parking device 1 is more compact, facilitating the miniaturization of the unmanned aerial vehicle parking device 1.

Further, the end portion of the first blocking portion of the stopping block 24 toward one end of the stop bar 23 is rounded off. In this way, the contacting portion between the stop bar 23 and the first blocking portion of the stopping block 24 is subjected to a relatively dispersed stress at the time of interference, which is beneficial to the structural stability of the stop bar 23 or the stopping block 24.

It should be noted that when the first movable seat 31 drives the driving rod 21 to move in the first position, the second position, and the second position, and both are the positions where the two first movable seats 31 move the driving rod 21 away from each other under the drive of the first driving mechanism 32.

In addition, an embodiment of the present disclosure is illustrated with a blocking assembly connected to either one of the two first movable seats 31. It could be understood that the number of blocking assemblies may also be two, in which case one blocking assembly is connected to one first movable seat 31. Of course, the number of blocking assemblies can also be four, in which case one blocking assembly is connected to any of the two first movable seats 31 and the two second movable seats 41.

It could also be understood that the driving rod 21 may not be connected to the first movable seat 31, i.e. the driving rod 21 may be driven by a separate driving mechanism, which may be a linear motor, a motor lead-screw structure, a gear rack structure, an electric push rod, an oil cylinder or like structures capable of the linear drive.

It could still be understood that the blocking assembly may also be provided without a moving piece, in which case the stop bar 23 is only driven to rotate by the driving rod 21 so that the stop bar 23 is switched between erecting and lying. Therefore, the blades of the unmanned aerial vehicle can also be collapsed without affecting the normal take-off of the unmanned aerial vehicle.

With continued reference to the example shown in FIG. 2, the unmanned aerial vehicle parking device 1 may further comprise a charging interface 50, the charging interface 50 being fixed to the first movable seat 31 and the charging interface 50 being electrically connected to the control board. Specifically, the number of charging interfaces 50 is two, and one charging interface 50 is fixed to one first movable seat 31. The use of two charging interfaces 50 can ensure that when one of the charging interfaces 50 encounters a problem, charging can still be performed normally. The two charging interfaces 50 may also achieve a separate arrangement of a positive electrode and a negative electrode. Illustratively, the charging interface 50 is a charging pogo pin.

Figure 8:
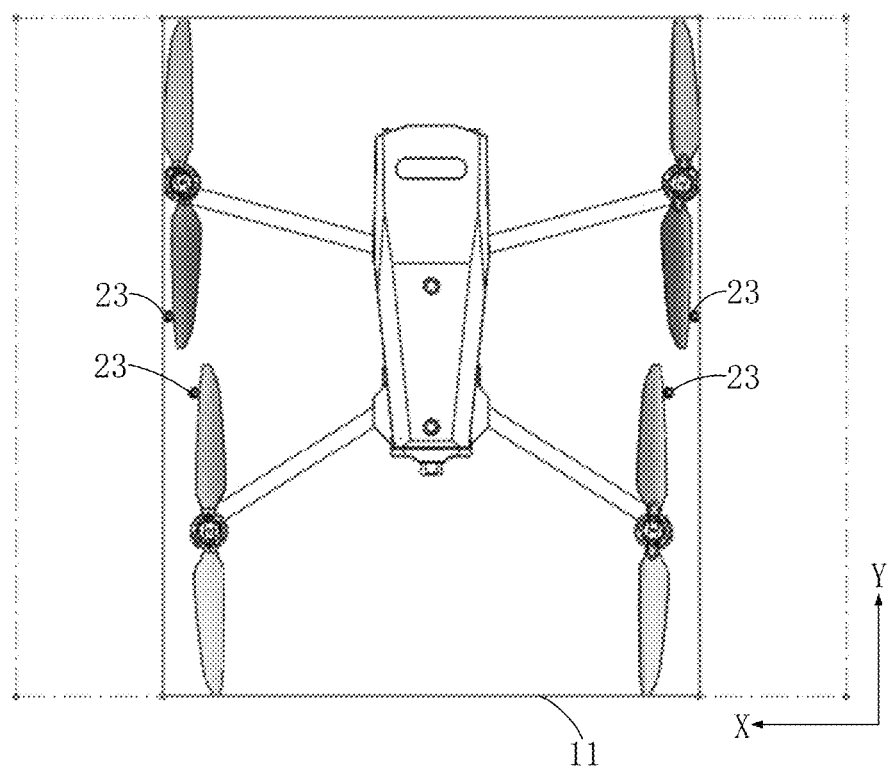
FIG. 8 is a schematic structural diagram of another kind of unmanned aerial vehicle parking device provided by an embodiment of the present disclosure.
Figure 9:
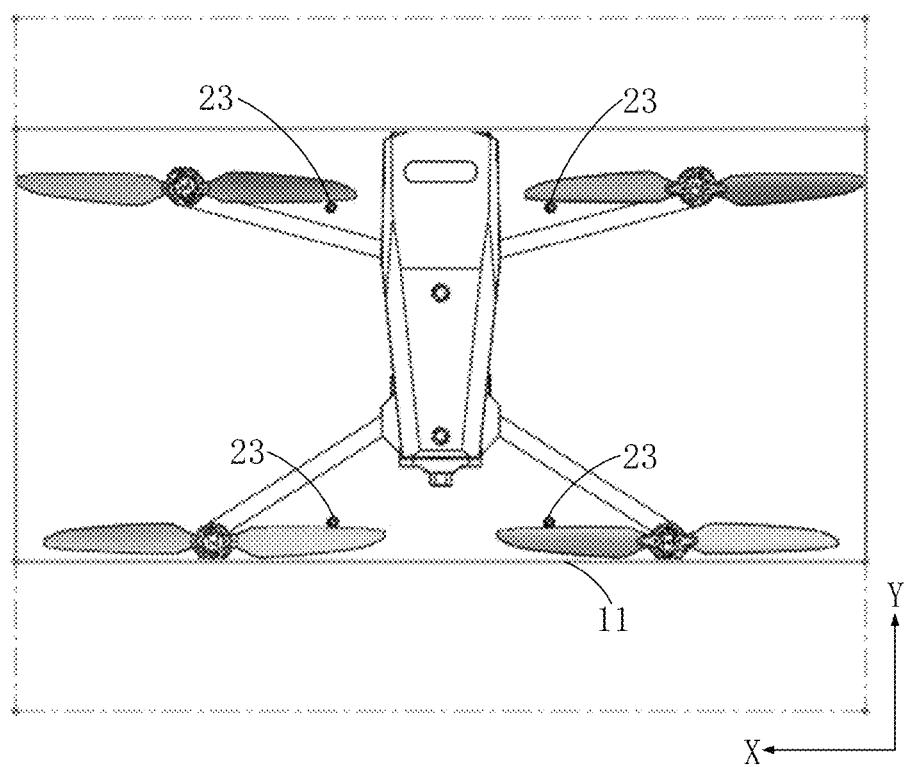
FIG. 9 is a schematic structural diagram of yet another kind of unmanned aerial vehicle parking device provided by an embodiment of the present disclosure.

Please refer to the examples shown in FIG. 8 and FIG. 9. FIG. 8 is a schematic structural diagram of another kind of unmanned aerial vehicle parking device 1 provided by an embodiment of the present disclosure. FIG. 9 is a schematic structural diagram of yet another kind of unmanned aerial vehicle parking device 1 provided by an embodiment of the present disclosure. The difference from the structure of the unmanned aerial vehicle parking device 1 shown in FIG. 2 is that the number of blocking assemblies in FIGS. 8 and 9 is four, and the four blocking assemblies are all driven by respectively separate driving mechanisms. The difference between FIG. 8 and FIG. 9 is that the stop bars 23 of the four blocking assemblies are respectively in different fixed positions when they are moved to the first position. It should be noted that in embodiments of the present disclosure, the blades of the unmanned aerial vehicle are all non-foldable, i.e. when one blade on the same rotating shaft rotates, as shown in FIG. 8 or FIG. 9, the other blade on the same rotating shaft also rotates along with it.

In FIG. 8, when the stop bars 23 of the four blocking assemblies move to the first position, they are all located at one end of the unmanned aerial vehicle arm away from the fuselage, namely, they are located on the side close to the blade of the unmanned aerial vehicle. At this time, each blade of the unmanned aerial vehicle is arranged in parallel with the second direction. Compared with the parallel arrangement of the blades in the first direction after the unmanned aerial vehicle lands, this way of collapsing can reduce the area occupied by the blades and save the lateral space occupied by the unmanned aerial vehicle when the unmanned aerial vehicle is loaded on the unmanned aerial vehicle parking device 1, thus reducing the volume required by the unmanned aerial vehicle parking device 1.

In FIG. 9, when the stop bars 23 of the four blocking assemblies move to the first position, they are all located at the end of the unmanned aerial vehicle arm close to the fuselage, namely, they are located at the side away from the blade of the unmanned aerial vehicle. At this time, the blades of the unmanned aerial vehicle are arranged parallel to the first direction. Compared with the parallel arrangement of the blades in the second direction after the unmanned aerial vehicle lands, this way of collapsing can reduce the area occupied by the blades and save the longitudinal space occupied by the unmanned aerial vehicle when the unmanned aerial vehicle is loaded on the unmanned aerial vehicle parking device 1, thus reducing the volume required by the unmanned aerial vehicle parking device 1.

The above descriptions are only embodiments of the present disclosure, and do not thus limit the scope of the patent of the present invention. Any equivalent structure or equivalent flow transformation made by using the content of the description and accompanying drawings of the present disclosure, or directly or indirectly applied in other related technical fields, is equally included in the scope of patent protection of the present invention.

What is claimed is:

1. An unmanned aerial vehicle parking device, comprising:
   a parking platform configured to bear an unmanned aerial vehicle; and
   a blocking assembly comprising a driving rod and a stop bar, the stop bar being connected to the driving rod, wherein:
   the driving rod is configured to move between a first position and a second position;
   when the driving rod moves from the first position to the second position, the driving rod drives the stop bar to rotate so that the stop bar lies flat relative to the parking platform, and the stop bar does not block a blade of the unmanned aerial vehicle from rotating;
   when the driving rod moves from the second position to the first position, the stop bar rotates relative to the driving rod and abuts against the parking platform so that the stop bar erects relative to the parking platform, and the stop bar blocks the rotation of the blade of the unmanned aerial vehicle.

2. The unmanned aerial vehicle parking device according to claim 1, wherein the blocking assembly comprises a movable rod respectively connected to the driving rod and the stop bar, wherein:
   the driving rod is configured to move between the second position and a third position, and the stop bars all lie flat relative to the parking platform;
   when the driving rod moves from the second position to the third position, the driving rod drives the movable rod to rotate so as to be viewed in a direction perpendicular to the parking platform, and a projection of the stop bar on the parking platform completely overlaps with the parking platform;
   when the driving rod moves from the third position to the second position, the movable rod rotates relative to the driving rod and abuts against the driving rod so as to be viewed in a direction perpendicular to the parking platform, and the projection of the stop bar on the parking platform partially overlaps with the parking platform.

3. The unmanned aerial vehicle parking device according to claim 2, wherein the blocking assembly further comprises a stop block fixed to the parking platform, the stop block having a first surface provided adjacent to the parking platform and a second surface provided opposite the parking platform, the first surface being provided with a first blocking portion, and the second surface being provided with a second blocking portion;
   wherein the movable rod comprises a first support arm and a second support arm arranged perpendicular to each other, the driving rod is rotatably connected to the first support arm, a connecting point of the driving rod to the first support arm is offset from an end portion of the first support arm away from one end of the second support arm, the stop bar is rotatably connected to the second support arm, and the connecting point of the stop bar to the second support arm is offset from the end portion of the stop bar near one end of the second support arm;
   when the driving rod moves from the first position to the second position, the driving rod drives the stop bar to rotate, and the end portion of the stop bar near one end of the second support arm is blocked by the first blocking portion to abut against the second surface, so that the stop bar lies flat relative to the parking platform, wherein the second support arm abuts against the driving rod under a rotation action of a movable piece;
   when the driving rod moves from the second position to the third position, the driving rod drives the movable rod to rotate, and the end portion of the first support arm away from one end of the second support arm is blocked by the second blocking portion so as to abut against the second blocking portion, so that the stop bar maintains lying flat relative to the parking platform;
   when the driving rod moves from the second position to the first position, the end portion of the stop bar near one end of the second support arm abuts against the parking platform under the rotation action of the stop bar, so that the stop bar erects relative to the parking platform, wherein the second support arm remains abutting against the driving rod under the rotation action of the movable piece.

4. The unmanned aerial vehicle parking device according to claim 3, wherein the end portion of the first blocking portion toward one end of the stop bar is rounded off.

5. The unmanned aerial vehicle parking device according to claim 1, wherein the unmanned aerial vehicle parking device further comprises a first re-centering assembly and a second re-centering assembly, wherein the first re-centering assembly and the second re-centering assembly are both fixed to the parking platform, and the first re-centering assembly and the second re-centering assembly are configured to push the unmanned aerial vehicle from a parking position to a re-centering position;
   wherein the driving rod is connected to the first re-centering assembly.

6. The unmanned aerial vehicle parking device according to claim 5, wherein the parking platform comprises a parking plate and a main body of the parking platform, the main body of the parking platform is provided with a cavity and an opening communicating the cavity with the outside, the cavity is configured to accommodate the first re-centering assembly and the second re-centering assembly, the parking plate is mounted at the opening and closes the opening, and the parking plate is configured to bear the unmanned aerial vehicle.

7. The unmanned aerial vehicle parking device according to claim 6, wherein the parking plate is provided with a first elongated hole and a second elongated hole, the first elongated hole is configured to cooperate with the first re-centering assembly to guide the first re-centering assembly, and the second elongated hole is configured to cooperate with the second re-centering assembly to guide the second re-centering assembly.

8. The unmanned aerial vehicle parking device according to claim 6, wherein the number of the first elongated hole and the second elongated hole is respectively two, wherein:
   in a first direction X, two first elongated holes are arranged at intervals in the parking plate;
   in a second direction Y, two second elongated holes are arranged at intervals in the parking plate; and
   in a third direction Z, the two first elongated holes are symmetrically arranged with a line segment formed by connecting the two second elongated holes as an axis of symmetry.

9. The unmanned aerial vehicle parking device according to claim 5, wherein the first re-centering assembly comprises a first driving mechanism and a first movable seat, wherein the first driving mechanism is fixed to the parking platform, the first movable seat is connected to the first driving mechanism and the number of the first movable seat is two, and the first driving mechanism is configured to drive the two first movable seats towards or away from each other;
   the second re-centering assembly comprises a second driving mechanism and a second movable seat, wherein the second driving mechanism is fixed to the parking platform, the second movable seat is connected to the second driving mechanism and the number of the second movable seat is two, and the second driving mechanism is configured to drive the two second movable seats close to or away from each other, wherein a motion direction of the second movable seat is perpendicular to the motion direction of the first movable seat;
   the number of the blocking assembly is two, the driving rod of one of the two blocking assemblies being connected to one of the two first movable seats.

10. The unmanned aerial vehicle parking device according to claim 9, wherein at least one of the first driving mechanism and the second driving mechanism is a lead screw driving mechanism.

11. The unmanned aerial vehicle parking device according to claim 9, wherein the first driving mechanism comprises a first driving motor, a first driving wheel, a first driven wheel, a first timing belt, and a first lead screw.

12. The unmanned aerial vehicle parking device according to claim 11, wherein the first driving motor and the first lead screw are both fixed to a main body of the parking platform, and the first lead screw rotates about its own axis, the first driving wheel is fixed to a rotating shaft of the first driving motor, the first driven wheel is fixed to one end of the first lead screw, and the first timing belt is sleeved between the first driving wheel and the first driven wheel.

13. The unmanned aerial vehicle parking device according to claim 11, wherein the first lead screw is provided with an external thread, the first movable seat is provided with an internal thread adapted to the external thread, and the first movable seat is threadedly connected to the first lead screw such that in a first direction X, the first driving mechanism drives the first movable seat to move relative to a parking plate of the parking platform.

14. The unmanned aerial vehicle parking device according to claim 9, wherein the second driving mechanism comprises a second driving motor, a second driving wheel, a second driven wheel, a second timing belt, and a second lead screw.

15. The unmanned aerial vehicle parking device according to claim 14, wherein the second driving motor and the second lead screw are both fixed to a main body of the parking platform, and the second lead screw rotates around its own axis, the second lead screw is arranged alternately with the first lead screw in a third direction Z, the second driving wheel is fixed to a rotating shaft of the second driving motor, the second driven wheel is fixed to one end of the second lead screw, and the second timing belt is sleeved on the second driving wheel and the second driven wheel.

16. The unmanned aerial vehicle parking device according to claim 14, wherein the second lead screw is provided with an external thread, the second movable seat is provided with an internal thread adapted to the external thread, and the second movable seat is threadedly connected to the second lead screw so that in a second direction Y, the second driving mechanism drives the second movable seat to move relative to a parking plate of the parking platform.

17. The unmanned aerial vehicle parking device according to claim 9, wherein the unmanned aerial vehicle parking device comprises a control board, and the control board is electrically connected to the first driving mechanism and the second driving mechanism respectively, so that while the first driving mechanism drives the first movable seat to move, the second driving mechanism drives the second movable seat to move.

18. The unmanned aerial vehicle parking device according to claim 17, wherein the unmanned aerial vehicle parking device comprises a charging interface, the charging interface being fixed to the first movable seat, the charging interface being electrically connected to the control board, and the charging interface being configured to connect to a power source of the unmanned aerial vehicle.

19. The unmanned aerial vehicle parking device according to claim 18, wherein the charging interface is a pogo pin.

* * * * *